US010100883B2

(12) United States Patent
Martin et al.

(10) Patent No.: US 10,100,883 B2
(45) Date of Patent: Oct. 16, 2018

(54) MULTIMODE CLUTCH ARRANGEMENTS

(71) Applicant: BorgWarner Inc., Auburn Hills, MI (US)

(72) Inventors: Keith Martin, Marlette, MI (US); John F. Guzdek, Clarkston, MI (US); Calahan Campton, Royal Oak, MI (US); Jennifer Kadlec, West Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/516,234

(22) PCT Filed: Sep. 18, 2015

(86) PCT No.: PCT/US2015/050837
§ 371 (c)(1),
(2) Date: Mar. 31, 2017

(87) PCT Pub. No.: WO2016/053642
PCT Pub. Date: Apr. 7, 2016

(65) Prior Publication Data
US 2017/0248177 A1 Aug. 31, 2017

Related U.S. Application Data

(60) Provisional application No. 62/081,434, filed on Nov. 18, 2014, provisional application No. 62/059,045, filed on Oct. 2, 2014.

(51) Int. Cl.
*F16D 41/16* (2006.01)
*F16D 23/00* (2006.01)
*F16D 28/00* (2006.01)

(52) U.S. Cl.
CPC ............. *F16D 41/16* (2013.01); *F16D 23/00* (2013.01); *F16D 28/00* (2013.01)

(58) Field of Classification Search
CPC ........ F16D 41/16; F16D 41/084; F16D 23/00; F16D 28/00
See application file for complete search history.

(56) References Cited

U.S. PATENT DOCUMENTS 2,407,468 A * 9/1946 Becker .................... E01B 31/06
192/43.1
5,967,277 A 10/1999 Walter
(Continued)

FOREIGN PATENT DOCUMENTS

JP 2004-144218 A 5/2004
WO WO 2009-132056 A2 10/2009
(Continued)

OTHER PUBLICATIONS

International Search Report for related PCT Application No. PCT/US2015/050837 dated Dec. 18, 2015.
(Continued)

*Primary Examiner* — Bradley T King
(74) *Attorney, Agent, or Firm* — Miller, Matthias & Hull LLP

(57) ABSTRACT

A clutch for selectively preventing rotation of a rotating component may include a first and second pawls pivotable between engagement and disengagement with the rotating component to selectively prevent or allow rotation of the rotating component in one or both directions. An armature moveable between a first and second armature positions may have a common member pivotally connected thereto and engaging the first and second pawls, with a torque spring biasing the common member to rotate toward the first pawl and away from the second pawl. In an intermediate armature position, the common member may disengage the first pawl
(Continued)

from the rotating component while engaging the second pawl to allow rotation in one direction while preventing rotation in the opposite direction. In embodiments, a clutch may include a cam actuator rotating to selectively control engagement of the pawls with the rotating component and locking in one or both directions.

12 Claims, 9 Drawing Sheets

(56) References Cited

U.S. PATENT DOCUMENTS

| | | | |
|---|---|---|---|
| 8,051,959 B2 | 11/2011 | Eisengruber | |
| 8,267,231 B2 | 9/2012 | Holmes | |
| 2009/0159391 A1 | 6/2009 | Eisengruber | |
| 2009/0266667 A1 | 10/2009 | Samie et al. | |
| 2014/0102844 A1* | 4/2014 | Greene | F16D 41/16 192/45.1 |
| 2015/0027256 A1* | 1/2015 | Rodrigues | F16H 1/06 74/411.5 |
| 2015/0354640 A1 | 12/2015 | Papania | |
| 2016/0003308 A1 | 1/2016 | Lee et al. | |
| 2016/0160941 A1* | 6/2016 | Green | F16D 27/09 192/71 |
| 2017/0240038 A1* | 8/2017 | Spangler | B60K 6/38 |
| 2017/0254376 A1* | 9/2017 | Campton | F16D 23/12 |
| 2018/0022201 A1* | 1/2018 | Samila | B60K 6/383 |

FOREIGN PATENT DOCUMENTS

| | | | |
|---|---|---|---|
| WO | WO 2010-056497 A2 | 5/2010 | |
| WO | 2014120595 A1 | 8/2014 | |
| WO | WO 2014-120595 A1 | 8/2014 | |
| WO | 2014137798 A1 | 9/2014 | |
| WO | WO 2014-137798 A1 | 9/2014 | |

OTHER PUBLICATIONS

International Search Report of PCT/US2015/050837 dated Dec. 18, 2015.

* cited by examiner

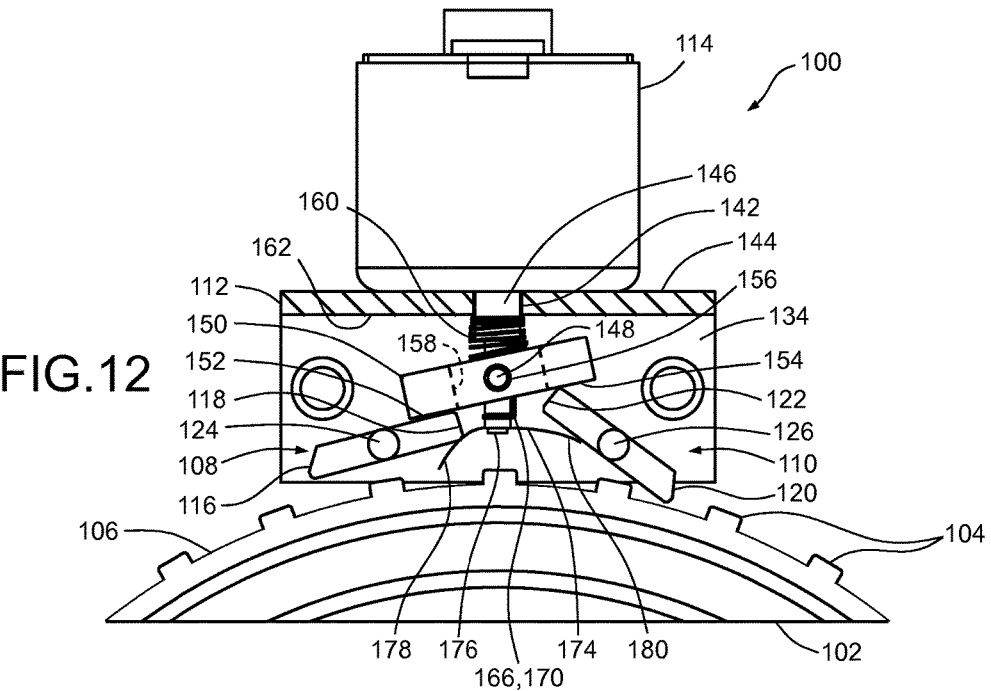
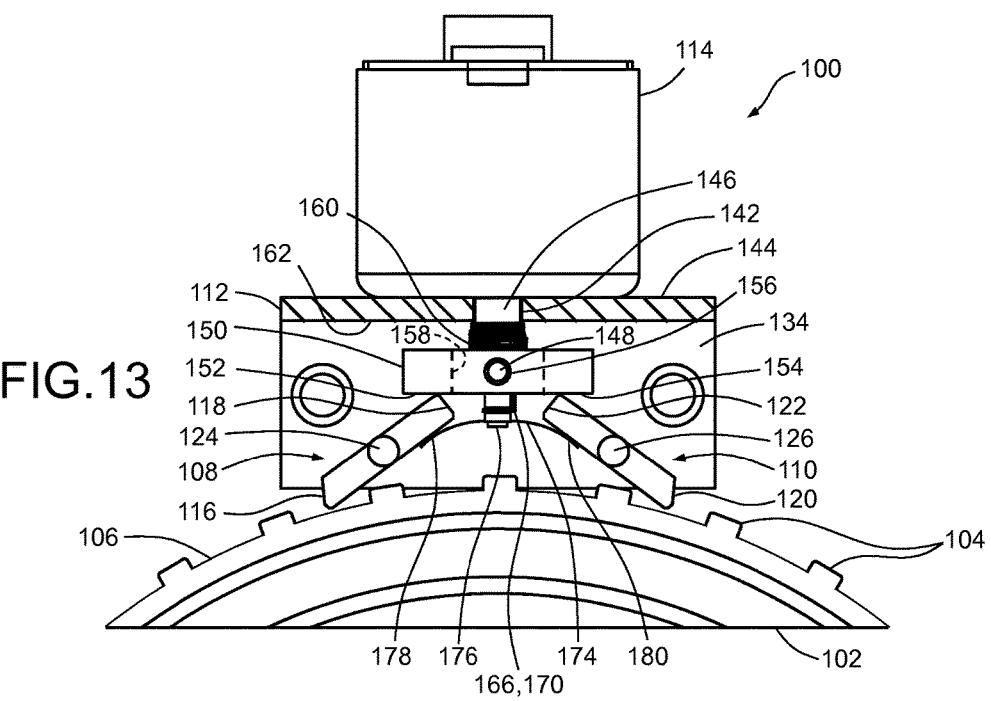

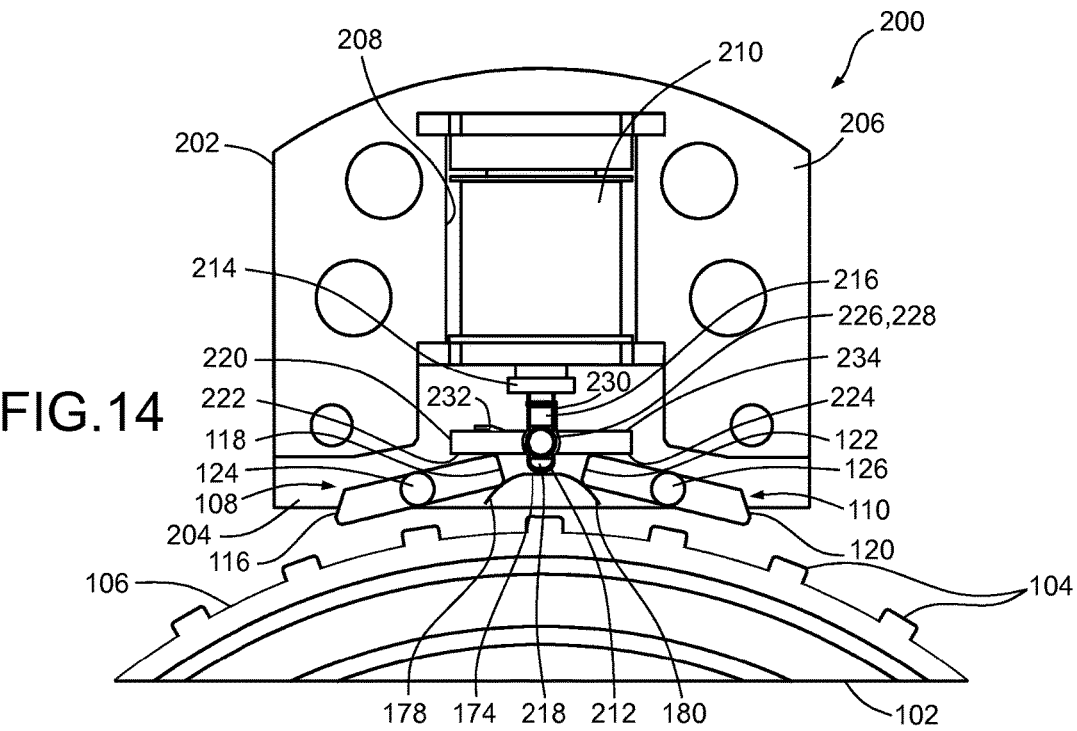
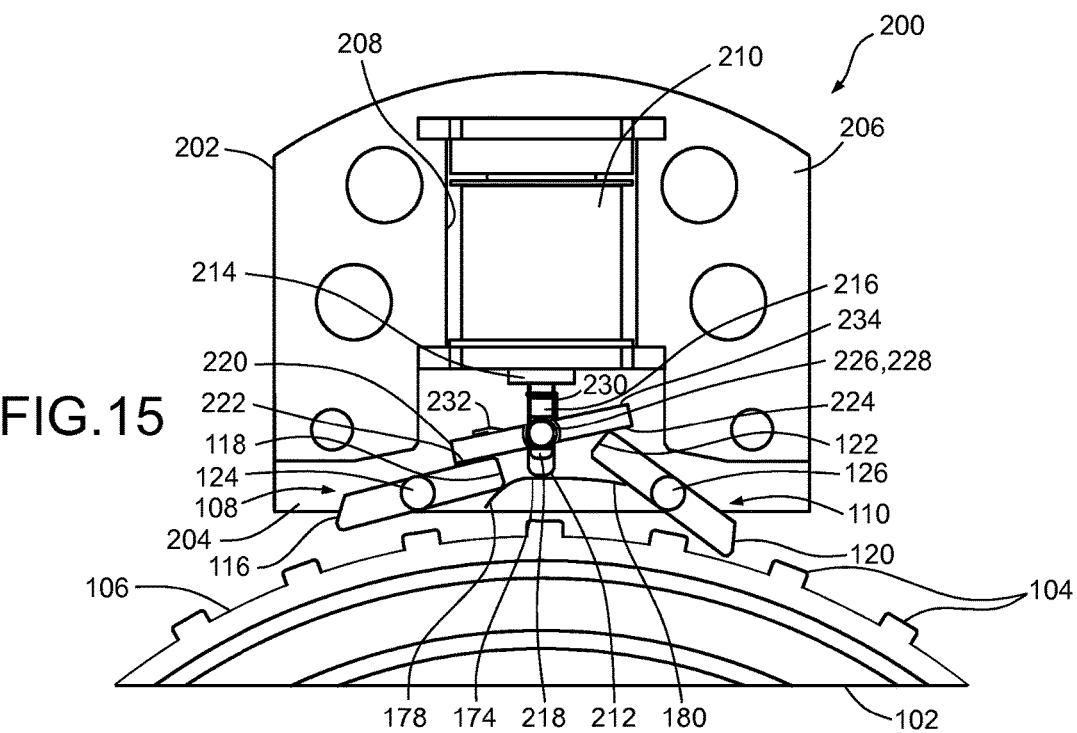

MULTIMODE CLUTCH ARRANGEMENTS

TECHNICAL FIELD

This disclosure relates generally to clutches, and in particular to clutches having multiple modes of engagement with a rotating element for selectively locking the element against rotation and allowing the element to rotate freely in one or both directions.

BACKGROUND

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutch units adapted to dynamically shift among variously available gear ratios without requiring driver intervention. Pluralities of such clutch units, also called clutch modules, are incorporated within such transmissions to facilitate the automatic gear ratio changes.

In an automatic transmission for an automobile, anywhere from three to ten forward gear ratios may be available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, the reliability of actuators used for automatically switching clutch modules between and/or among various available operating modes is a consistent design concern. It is also desirable to provide smooth transitions between the operating modes when the clutch modules engage and disengage from the gears. These considerations are also important in other operating environments where multimode clutch modules may be implemented to selectively allow and restrict the rotation of rotating components such as gears, shafts, torque converter components and the like. Therefore, much effort has been directed to finding ways to assure actuator reliability and seamless performance at competitive costs.

SUMMARY OF THE DISCLOSURE

In one aspect of the present disclosure, a clutch for selectively preventing rotation of a rotating component is disclosed. The clutch may include a first pawl that is pivotable about a first pawl pivot between engagement with the rotating component to prevent rotation of the rotating component in a first direction and disengagement with the rotating component to allow rotation of the rotating component in the first direction, a second pawl that is pivotable about a second pawl pivot between engagement with the rotating component to prevent rotation of the rotating component in a second direction and disengagement from the rotating component to allow rotation of the rotating component in the second direction, and an armature that is moveable between a first armature position and a second armature position. The clutch may further include a common member pivotally connected to the armature and engaging the first pawl and the second pawl to move the first pawl and the second pawl between engagement with and disengagement from the rotating component, and a torque spring biasing the common member to rotate toward the first pawl and away from the second pawl. When the armature is in the first armature position, the common member engages the first pawl and the second pawl to disengage the first pawl and the second pawl from the rotating component and allow rotation of the rotating component in the first direction and the second direction, when the armature is in the second armature position, the common member engages the first pawl and the second pawl to cause the first pawl and the second pawl to engage the rotating component and prevent rotation of the rotating component in the first direction and the second direction, and when the armature is in an intermediate armature position between the first armature position and the second armature position, the common member engages the first pawl to disengage the first pawl from the rotating component and allow the rotating component to rotate in the first direction, and engages the second pawl to cause me second pawl to engage the rotating component and prevent rotation of the rotating component in the second direction.

In various embodiments, the clutch may include an armature return spring biasing the armature toward the first armature position, an actuator coupled to the armature and actuatable to move the armature from the first armature position to the second armature position and the actuator may be actuatable to maintain the armature at the intermediate armature position. In other embodiments, the clutch may include a pawl spring connected to the armature or a clutch housing and biasing the first pawl and the second pawl toward engagement with the rotating component. The common member may include a bottom surface having a first distal end engaging the first pawl and a second distal end engaging the second pawl, the armature may include a pivot arm extending outwardly from the armature and the common member may be pivotally mounted on the pivot arm for rotation of the common member relative to the armature, and the torque spring may be mounted to the armature and the common member and may include a coil portion wrapped around the pivot arm, a first spring arm engaging the armature, and a second spring arm engaging the common member. In other configurations, the armature may include an upper pivot arm extending outwardly from the armature, a lower pivot arm extending outwardly from the armature and axially spaced apart from the upper pivot arm along the armature, with the common member being pivotally mounted on the armature between the upper pivot arm and the lower pivot arm.

In another aspect of the present disclosure, a clutch for preventing rotational movement of a gear is disclosed. The clutch may include a first pawl that includes a first toe and pivots about a first pawl pivot, a second pawl that includes a second toe and pivots about a second pawl pivot, and a cam actuator that rotates to selectively control engagement of the first toe and the second toe with the gear.

In various embodiments, the cam actuator may engage a first heel of the first pawl and a second heel of the second pawl, and the clutch may include a spring biased against the first heel of the first pawl and the second heel of the second pawl. In other embodiments, the clutch may include a first mechanical link connecting the cam actuator and the first toe and a second mechanical link connecting the cam actuator and the second toe. When the cam actuator is positioned in a first mode, the first toe and the second toe do not engage the gear, when the cam actuator is positioned in a second mode, the first toe engages the gear to prevent rotation of the gear in a first direction and the second toe does not engage the gear, and when the cam actuator is positioned in a third mode, the second toe engages the gear to prevent rotation of the gear in a second direction and the first does not engage the gear. When the cam actuator is positioned in a fourth mode, the first toe and the second toe engage the gear to prevent rotation of the gear in the first direction and the second direction. In one embodiment, the cam actuator may include an outer cam surface having a first protuberance, and second protuberance and a primary detent, wherein when the cam actuator is positioned in a first mode, the primary detent engages the first pawl and the second protuberance engages the second pawl to cause the first toe and the second toe to engage the gear to prevent rotation of the gear in a first direction and a second direction, when the cam actuator is positioned in a second mode, the first protuberance engages the first pawl to cause the first toe to engage the gear to prevent rotation of the gear in the first direction and the second protuberance engages the second pawl so that the second toe does not engage the gear, when the cam actuator is positioned in a third mode, the first protuberance engages the first pawl and the second protuberance engages the second pawl so that the first toe and the second toe do not engage the gear, and when the cam actuator is positioned in a fourth mode, the first protuberance engages the first pawl so that the first toe does not engage the gear and the primary detent engages the second pawl to cause the second toe to engage the gear to prevent rotation of the gear in the second direction.

Additional aspects are defined by the claims of this patent.

BRIEF DESCRIPTION OF THE DRAWINGS

FIG. 12 is the plan view of the embodiment of the clutch of FIG. 9 with the clutch positioned in an intermediate mode with respect to the gear the clutch controls;

FIG. 13 is the plan view of the embodiment of the clutch of FIG. 9 with the clutch positioned in a second or two-way locked mode with respect to the gear the clutch controls;

FIG. 14 is a plan view of a still further alternative embodiment of a clutch with a portion of its housing removed as the clutch is positioned in a first or unlocked mode with respect to a gear the clutch controls;

FIG. 15 is the plan view of the embodiment of the clutch of FIG. 14 with the clutch positioned in an intermediate mode with respect to the gear the clutch controls.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using a sentence stating that the term is hereby defined to have a specified meaning, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

A first embodiment of a clutch described below can control the rotational movement of a rotating component, such as a gear having a plurality of teeth, cogs, detents or similar components. The clutch can include a first pawl and a second pawl that pivot about separate axes to selectively engage and disengage the gear and permit or prevent rotational motion of the gear. The first and second pawls can be controlled by a cam actuator that moves the first pawl, the second pawl, or both pawls into contact with the gear as well as disengaging the first pawl, the second pawl, or both from the gear. The embodiments of the clutch shown and described can be used in a wide variety of applications that benefit from controlling gears. The clutch can be used to control movement of gears within vehicle transmissions but other applications involving selectively allowing rotational motion are possible as well.

Figure 1:
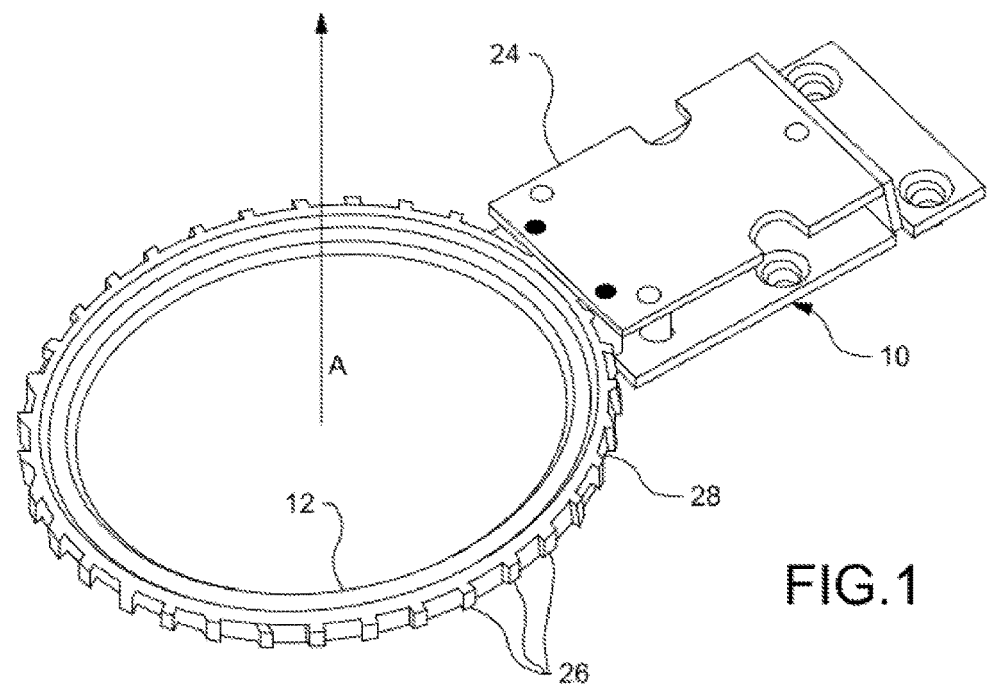
FIG. 1 is perspective view of an embodiment of a clutch as it is positioned in relation to a gear the clutch controls.
Figure 2:
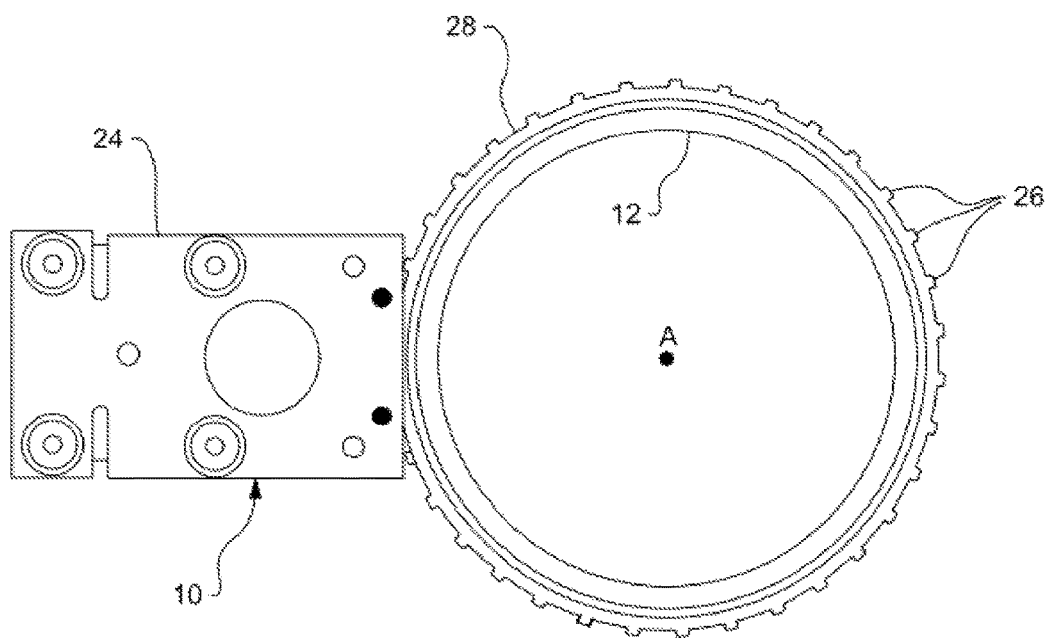
FIG. 2 is a plan view of an embodiment of a clutch as it is positioned in relation to a gear the clutch controls.
Figure 3:
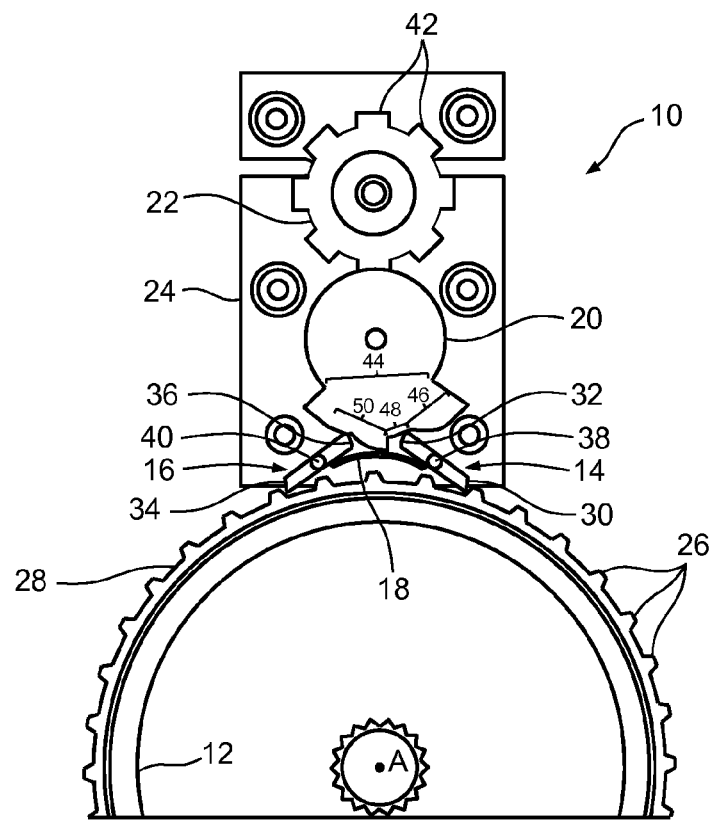
FIG. 3 is a plan view of an embodiment of a clutch with a portion of its housing removed as the clutch is positioned in relation to a gear the clutch controls.

Turning to FIGS. 1-3, an embodiment of a clutch 10 is shown as it engages a gear 12. In this embodiment, the clutch 10 includes a primary or first pawl 14, a secondary or second pawl 16, a spring 18, a cam actuator 20, and a drive sprocket 22 that are carried by a clutch housing 24. The clutch 10 can be positioned adjacent to the gear 12 such that portions of the first pawl 14 and the second pawl 16 selectively engage gear teeth 26 positioned on an outer surface 28 of the gear 12. While gear teeth 26 in this embodiment are shown on the outer surface 28, other configurations are possible. For example, the clutch 10 can be used with different gear designs, such as internal spur gears or splines that are known to those skilled in the art. Rotation of the gear 12 can include four states: unimpeded rotation, fully-prevented rotation, rotation only in a clockwise direction, and rotation only in a counterclockwise rotation. The cam actuator 20 can control the clutch 10 to permit the gear 12 to move in accordance with one of these four states by selectively engaging and disengaging the first pawl 14, the second pawl 16, or both with respect to the gear 12.

The first pawl 14 can include a primary or first toe 30 and a primary or first heel 32 while the second pawl 16 can include a secondary or second toe 34 and a secondary or second heel 36. A primary or first pawl pivot 38 can be located between or at the first toe 30 and the first heel 32 while a secondary or second pawl pivot 40 can be located between the second toe 34 and the second heel 36. The spring 18 can be carried by the clutch housing 24 and bias both the first heel 32 and second heel 36 into contact with the cam actuator 20. The force of the spring 18 can also pivot the first pawl 14 and the second pawl 16 about their respective pivots 38, 40 such that the first toe 30 and second toe 34 engage the gear teeth 26.

The embodiment of the clutch 10 shown in FIG. 3 includes a drive sprocket 22 having a plurality of teeth 42. A recessed portion of the cam actuator 20 can receive the teeth 42 and transmit rotational force from the drive sprocket 22 to the cam actuator 20. As the drive sprocket 22 is rotated in one direction, it rotates the cam actuator 20 in the opposite direction and in the process controls the first pawl 14 and the second pawl 16. The drive sprocket 22 can be powered by a wide variety of electrical or mechanical devices used to create rotational motion. For example, the drive sprocket 22 can be rotated using an electric motor, a solenoid, a hydraulic drive or other similar device. In alternative embodiments, a linear actuator may be used in place of the drive sprocket 22 to drive the cam actuator 20 via an appropriate mechanical connection such as a rack and pinion arrangement. While FIG. 3 depicts the cam actuator 20 controlled by the drive sprocket 22, it is also possible to implement the clutch 10 without the drive sprocket 22 such that the electrical/mechanical devices rotate the cam actuator 20 directly. The cam actuator 20 can include an outer cam surface 44 that is shaped so that the first pawl 14 and the second pawl 16 can be sequentially actuated in response to rotation of the cam actuator 20 in one direction. The outer cam surface 44 can also include a primary or first protuberance 46, a primary detent 48, and a secondary or second protuberance 50. The operation of the cam actuator 20 and the various portions of the outer cam surface 44 will be described in more detail with respect to FIGS. 4-7.

Figure 4:
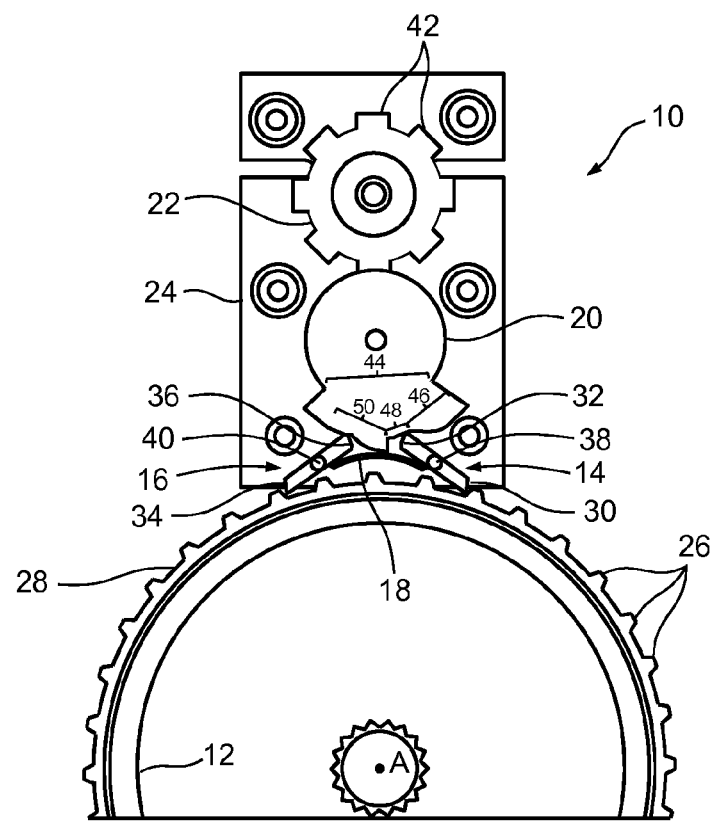
FIG. 4 is the plan view of the embodiment of the clutch of FIG. 3 with a cam actuator of the clutch positioned in a first mode with respect to the gear the clutch controls.

The gear 12 can be prevented from rotating about an axis A in both a clockwise and counterclockwise direction when the first toe 30 and the second toe 34 are biased into contact with the gear teeth 26 about the first pawl pivot 38 and the second pawl pivot 40, respectively, by the spring 18. In this position of the cam actuator 20, the first protuberance 46 and the second protuberance 50 of the outer cam surface 44 allow the first pawl 14 and the second pawl 16, respectively, to rotate toward the outer surface 28 of the gear 12. This can be referred to as a first mode, a two-way lock mode or a default mode and is shown in FIG. 4. Though "clockwise" and "counterclockwise" are used herein for clarity between the illustrations of the embodiments and the directions of rotation of the elements, the rotation of the elements could also be considered to be in "a first direction of rotation" and "a second direction of rotation" that is opposite the first direction of rotation.

Figure 5:
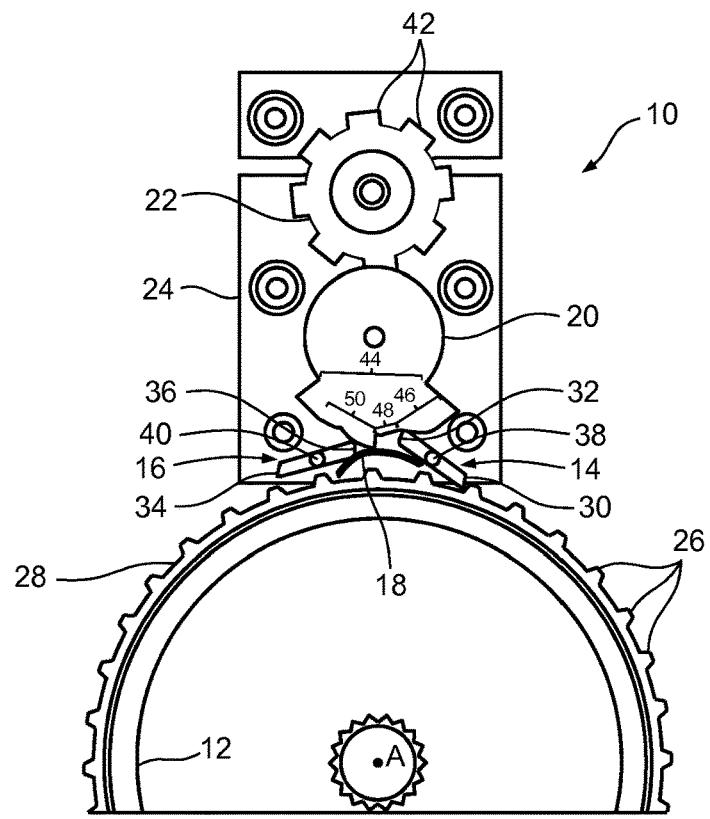
FIG. 5 is the plan view of the embodiment of the clutch of FIG. 3 with a cam actuator of the clutch positioned in a second mode with respect to the gear the clutch controls.

In a second mode or a one-way lock mode, the clutch 10 can permit the gear 12 to rotate in a clockwise direction as shown in the drawing figures, but prevent rotational motion in a counterclockwise direction. The configuration of the components of the clutch 10 for the second mode is shown in FIG. 5. To configure the clutch 10 for the second mode, the cam actuator 20 can be rotated in a clockwise direction so that the second protuberance 50 displaces the second heel 36 toward the gear teeth 26. The second pawl 16 can pivot in the clockwise direction and disengage the second toe 34 from the gear teeth 26 permitting the gear 12 to freely rotate in the clockwise direction. As the gear 12 rotates in the clockwise direction, the gear teeth 26 rotate the first pawl 14 in the counterclockwise direction and move the first toe 30 in an outward direction toward the clutch 10 against the spring 18 acting on the first heel 32 and biasing the first toe 30 in the clockwise direction back toward the gear teeth 26. The amount of angular rotation used by the second protuberance 50 to release the second toe 34 can be equal to or less than the arc of the primary detent 48. The primary detent 48 can be shaped such that when the cam actuator 20 rotates and moves the second pawl 16 with the second protuberance 50, the primary detent 48 permits the first toe 30 to remain engaged with the gear teeth 26 despite the cam actuator rotation.

Figure 6:
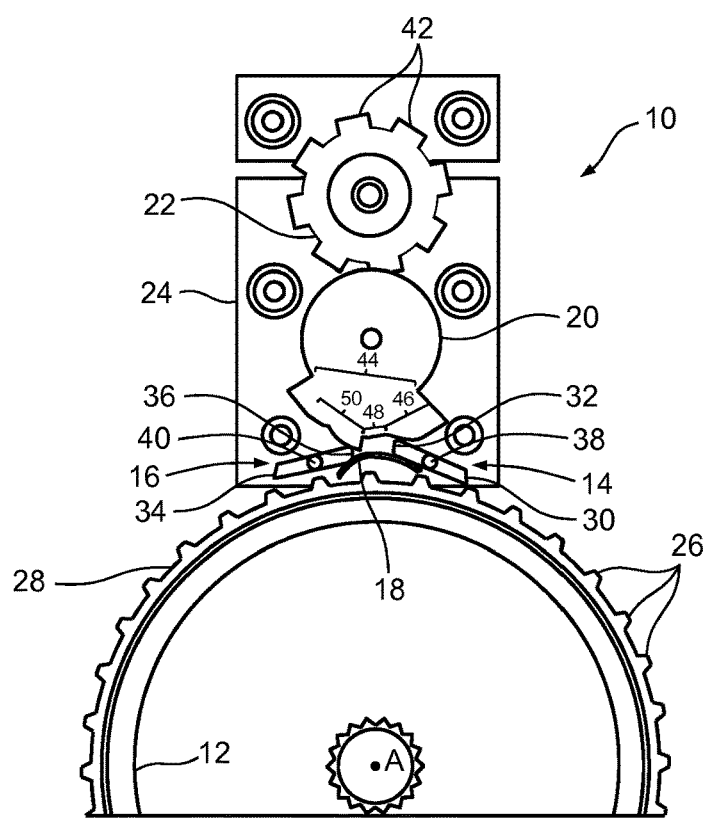
FIG. 6 is the plan view of the embodiment of the clutch of FIG. 3 with a cam actuator of the clutch positioned in a third mode with respect to the gear the clutch controls.
Figure 7:
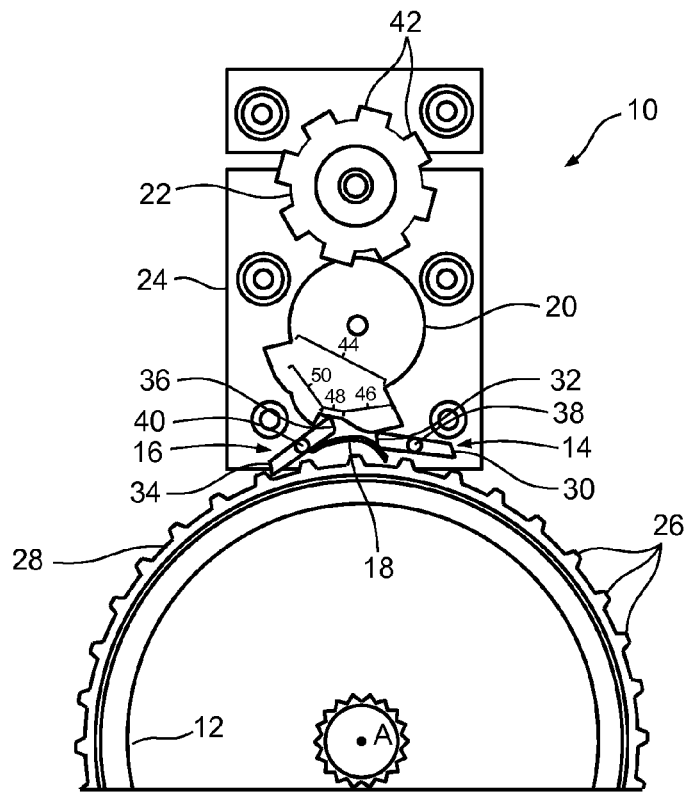
FIG. 7 is the plan view of the embodiment of the clutch of FIG. 3 with a cam actuator of the clutch positioned in a fourth mode with respect to the gear the clutch controls.

A third mode or a two-way unlock mode is shown in FIG. 6 in which the cam actuator 20 continues rotating in the clockwise direction past its location in the second mode to disengage both the first toe 30 as well as the second toe 34 from the gear teeth 26. During the third mode, the second protuberance 50 can include a profile that maintains the second toe 34 in a disengaged relationship with the gear teeth 26 while the first heel 32 is engaged by the first protuberance 46 and pivoted toward the gear teeth 26. As the first heel 32 is moved toward the gear teeth 26 against the force of the spring 18, the first toe 30 can disengage from the gear teeth 26. When the first toe 30 and the second toe 34 are disengaged from the gear teeth 26, the gear 12 is free to rotate in either the clockwise or the counterclockwise direction.

The cam actuator 20 can continue to rotate in a clockwise direction from the third mode to a fourth mode or an additional one-way lock mode (FIG. 7) that permits rotation of the gear 12 only in the counterclockwise direction. As the cam actuator 20 rotates from its position in the third mode to the fourth mode, the second protuberance 50 of the outer cam surface 44 may rotate past the second heel 36 and align the second heel 36 with the primary detent 48. As the second heel 36 transitions between the second protuberance 50 and the primary detent 48, the force of the spring 18 rotates the second pawl 16 in the counterclockwise direction so the second heel 36 moves toward the primary detent 48 of the outer cam surface 44 thereby pivoting the second toe 34 into contact with the outer surface 28 and the gear teeth 26. While the second toe 34 engages the gear teeth 26, the first protuberance 46 can maintain the first toe 30 in a disengaged position with respect to the gear teeth 26. The relative positions of the first toe 30 and the second toe 34 can prevent rotational motion of the gear 12 in the clockwise direction while allowing rotational motion in the counterclockwise direction.

Figure 8:
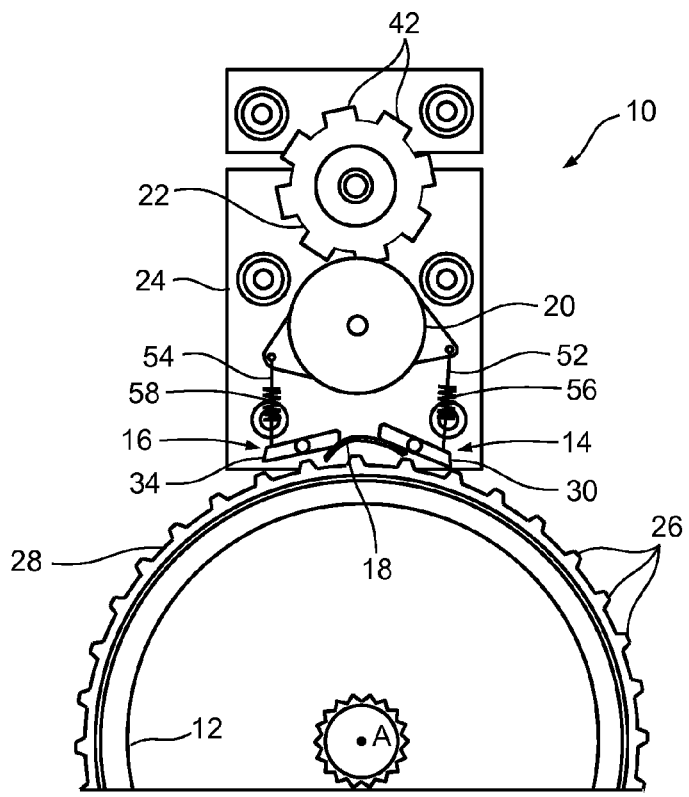
FIG. 8 is a plan view of another embodiment of a clutch with a portion of its housing removed.

Other implementations of the clutch are possible besides those shown in FIGS. 1-7. For example, FIG. 8 depicts an embodiment of the clutch 10 that includes the first pawl 14, the second pawl 16, and the cam actuator 20. Here, the cam actuator 20 can be connected to the first toe 30 via a primary or first mechanical link 52 and a secondary or second toe 34 via a secondary or second mechanical link 54. A primary or first spring 56 and a secondary or second spring 58 can be included in the first mechanical link 52 and the second mechanical link 54, respectively. FIG. 8 depicts a single cam actuator 20 controlling both the first mechanical link 52 and the second mechanical link 54. As shown, both the first toe 30 and the second toe 34 are disengaged from the gear teeth 26 to allow free rotation of the gear 12 in either direction in a similar manner as the third mode as shown in FIG. 6. In this implementation, the cam actuator 20 can be rotated in the counterclockwise direction to pull the first toe 30 further away from the gear teeth 26, while at the same time the cam actuator 20 can also apply force on the second toe 34 via the second mechanical link 54 to rotate the second toe 34 of the second pawl 16 into engagement with the gear teeth 26. Similar to the fourth mode of FIG. 7, the gear 12 is permitted to rotate in the counterclockwise direction while rotation in the clockwise direction is prevented. The gear 12 can overcome the force applied by the second spring 58 as it rotates in the counterclockwise direction and the gear teeth 26 will move the second toe 34 toward the cam actuator 20, but the second toe 34 will engage the gear teeth 26 to prevent rotation in the clockwise direction. Conversely, the cam actuator 20 can be rotated in a clockwise direction to pull the second toe 34 away from the gear teeth 26. At the same time, the cam actuator 20 can also apply force on the first toe 30 via the first mechanical link 52 to engage the gear teeth 26. This can permit the gear 12 to rotate in a clockwise direction while preventing rotation in a counterclockwise direction in a similar manner as the second mode shown in FIG. 5. The gear 12 can rotate in a clockwise direction and the gear teeth 26 can move the first toe 30 toward the cam actuator 20 and overcome the force applied by the first spring 56.

The implementation of the clutch 10 shown in FIG. 8 may prevent rotation in only one direction at a time, or allow free rotation in both directions. However, it should be appreciated that other implementations of the clutches 10 described herein are possible. For instance, the cam actuator 20 shown in FIGS. 1-7 could be substituted with a clutch 10 that used a first cam actuator and a second cam actuator. That is, rather than using a single cam that sequentially enters the four modes described above, the clutch 10 could use two cam actuators to directly move from any one of those modes to any other mode without entering an intermediate mode. The two cam actuators can engage the first pawl 14 and second pawl 16 at the same time, disengage the first pawl 14 and the second pawl 16 at the same time, or separately engage or disengage the first pawl 14 and the second pawl 16. That is, the cams can be actuated at the same time or deactivated at the same time. In another implementation, the clutch 10 could be configured to eliminate either the first pawl 14 or the second pawl 16. Eliminating one of the pawls 14, 16 can render a one-way or two-mode clutch 10 that allows free movement of the gear 12 or limits rotational motion in one direction. In another example, the clutch 10 shown in FIG. 8 could use a first cam actuator and a second cam actuator. In such an arrangement, the four modes of operation discussed above could be realized in a toe-actuated system.

Figure 9:
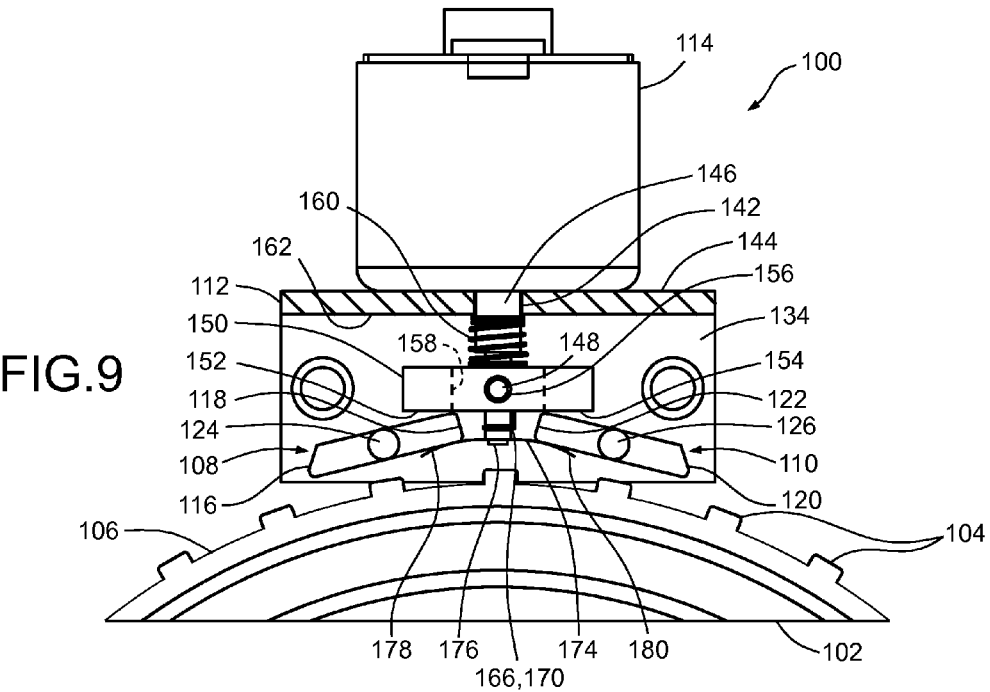
FIG. 9 is a plan view of a further alternative embodiment of a clutch with a portion of its housing removed as the clutch is positioned in a first or unlocked mode with respect to a gear the clutch controls.

A further alternative embodiment of a clutch 100 is shown in FIGS. 9-14. Referring to FIG. 9, the clutch 100 as shown is implemented with a gear 102 to control the rotation of the gear 102 by selectively engaging and disengaging from gear teeth 104 disposed on an outer surface 106 of the gear 102. While the gear teeth 104 in this embodiment are shown on the outer surface 106, other configurations are possible, such as the use of the clutch 100 with different gear designs such as internal spur gears or splines as discussed with the embodiments described above. In this embodiment, the clutch 100 includes a primary or first pawl 108 and a secondary or second pawl 110 that are carried on a clutch bracket or clutch housing 112, and an actuator 114 that will control the positioning of the pawls 108, 110 to lock and unlock the clutch 100. The clutch housing 112 is shown in cross-section to facilitate illustration and description of the components of the clutch 100 residing therein. In a similar manner as described above for the pawls 14, 16, the first pawl 108 can include a first tooth engaging end or first toe 116 and a first releasing end or first heel 118 while the second pawl 110 can include a second tooth engaging end or second toe 120 and a second releasing end or second heel 122. A first pawl pivot 124 having first pivot ends can be located between the first toe 116 and the first heel 118, and a second pawl pivot 126 having second pivot ends can be located between the second toe 120 and the second heel 122, and can be mounted in corresponding apertures of the clutch housing 112 as discussed below to allow the pawls 108, 110 to pivot between locked and unlocked positions.

Figure 10:
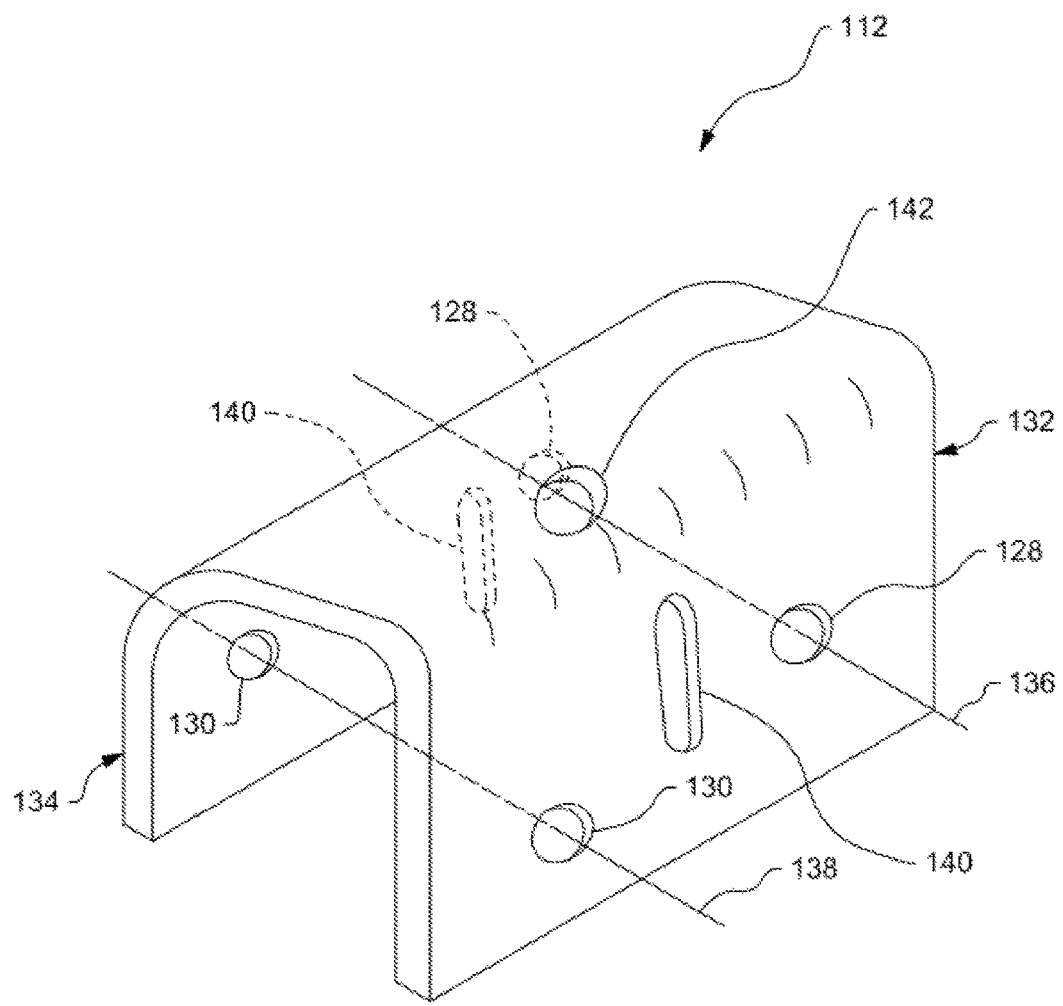
FIG. 10 is a perspective view of a clutch housing of the embodiment of the clutch of FIG. 9.

The clutch housing 112 is shown in greater detail in FIG. 10. The clutch housing 112 includes a substantially U-shaped cross section and a plurality of apertures through which elements of the clutch 100 can pass. The clutch housing 112 includes primary or first pawl apertures 128 for receiving corresponding ends of the first pawl pivot 124 of the first pawl 108 as well as secondary or second pawl apertures 130 for receiving corresponding ends of the second pawl pivot 126 of the second pawl 110. The first pawl apertures 128 and the second pawl apertures 130 can be axially spaced from each other on opposite sides 132, 134 of the clutch housing 112. The axial spacing of the apertures 128, 130 can permit the first pawl 108 and the second pawl 110 to each pivot about different axes 136, 138 located between and passing through the sides 132, 134, respectively. The clutch housing 112 may have additional openings, including vertical slots 140 through the sides 132, 134 and an armature aperture 142 through a top wall 144 of the clutch housing 112, for other components of the clutch 100 as will be discussed further hereinafter. The clutch housing 112 can be formed from a variety of materials as will be apparent to those skilled in the art. In one implementation, the clutch housing 112 can be formed from a metal alloy using extrusion techniques. However, it should be appreciated that the shape and design of the clutch housing 112 can deviate from what is shown herein.

Returning to FIG. 9, the actuator 114 as shown may be a solenoid, hydraulic or other appropriate type of linear actuator capable of creating linear motion as described herein. In alternative embodiments, the actuator may be a rotary actuator such as a stepper motor operatively connected to the elements of the clutch 100 by a linkage or other appropriate mechanism known in the art for converting rotation generated by the rotary actuator into the linear motion described herein. The illustrated actuator 114 may include a piston or armature 146 extending therefrom through the armature aperture 142 of the clutch housing 112 and into the interior of the clutch housing 112 to a first armature position or an extended armature position. The armature 146 may include pivot arm 148 extending outwardly on both sides of the armature 146 and being received by the vertical slots 140 through the sides 132, 134 of the clutch housing 112 to allow the armature 146 to move linearly upwardly and downwardly within the limits allowed by the vertical slots 140. The pivot arm 148 may pass through the armature 146 and extend outwardly. In alternative embodiments, the pivot arm 148 may be integrally formed with the armature 146.

The clutch 100 further includes a common member 150 pivotally mounted on the pivot arm 148 of the armature 146 and disposed above the first pawl 108 and the second pawl 110 with a primary or first distal end 152 of a bottom surface of the common member 150 engaging the first heel 118 and a secondary or second distal end 154 engaging the second heel 122. The pivot arm 148 are received in corresponding common member pivot apertures 156 on either side of the common member 150 so that the common member 150 can pivot about an axis that is approximately parallel to the axes 136, 138 of the pawls 108, 110, respectively. The interconnection between the armature 146 and the common member 150 is shown in greater detail in FIG. 11 in which the common member 150 is shown in partial cross-section. A vertical opening 158 through the common member 150 through which the armature 146 passes provides sufficient space for the common member 150 to pivot about the pivot arms 148 without engaging the armature 146 during operation of the clutch 100 as discussed more fully below. Where the pivot arm 148 is a separate component, the common member 150 may be positioned relative to the armature 146, and then the pivot arm 148 may be inserted through the pivot apertures 156 and the corresponding hole through the armature 146. If the armature 146 and pivot arm 148 are integrally formed, the common member 150 may be formed in two halves that can be installed on the pivot arm 148 on each side of the armature 146 and then secured together. In further alternative embodiments, the armature 146 and the common member 150 may be formed concurrently through three-dimensional printing, injection molding or other appropriate integrated manufacturing technique.

Figure 11:
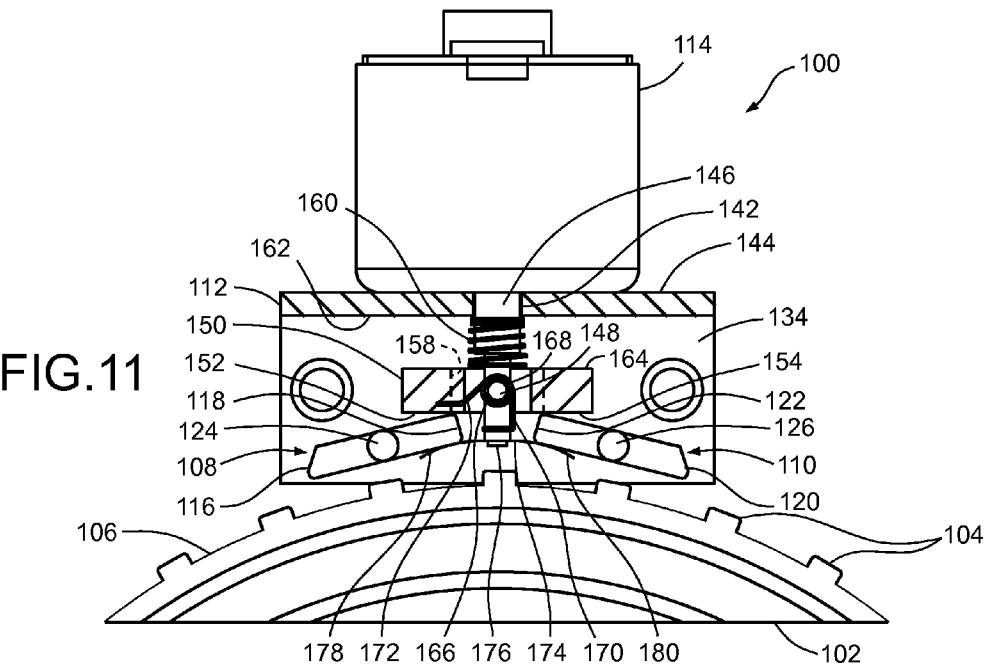
FIG. 11 is the plan view of the embodiment of the clutch of FIG. 9 with a common member shown in partial cross-section.

FIG. 11 also shows various biasing mechanisms that may be used to control the movement of the armature 146, the common member 150 and the pawls 108, 110 during operation of the clutch 100. A compressive spring or armature return spring 160 may be provided to bias the armature 146 and the common member 150 toward a normal or two-way unlocked position shown in FIGS. 9 and 11 when the actuator 114 is not actuated. In the present embodiment, the armature return spring 160 is a coil spring disposed around the armature 146 and positioned between an inner surface 162 of the top wall 144 of the clutch housing 112 and a top surface 164 of the common member 150 to bias the common member 150 away from the actuator 114. With this configuration, the armature return spring 160 may allow the common member 150 to pivot about the pivot arms 148 while applying the biasing force. The coil spring arrangement of the armature return spring 160 is exemplary only, and other configurations of biasing mechanisms for biasing the armature 146 and the common member 150 toward the illustrated position while allowing the common member 150 to pivot will be apparent to those skilled in the art.

A torsional spring or torque spring 166 may be provided to bias the common member 150 to rotate in a counterclockwise direction about the pivot arms 148 as shown in FIGS. 9 and 11. As shown, the torque spring 166 includes a coil portion 168 wrapped around the pivot arms 148 of the armature 146, a first spring arm 170 engaging the armature 146, and a second spring arm 172 engaging the common member 150. The tension in the coil portion 168 of the torque spring 166 tends to pull or rotate the spring arms 170, 172 toward each other. With the first spring arm 170 fixed to the armature 146, the second spring arm 172 will rotate counterclockwise toward the armature 146 as shown in FIGS. 9 and 11 and cause a corresponding rotation of the common member 150. The illustrated arrangement of the torque spring 166 is exemplary only, and other configurations of biasing mechanisms for causing the common member 150 to rotate relative to the armature 146 are contemplated by the inventors.

In addition to the armature return spring 160 and the torque spring 166, the clutch 100 may include an additional biasing mechanism in the form of a pawl spring 174 engaging the heels 118, 122 of the pawls 108, 110 opposite the distal ends 152, 154 of the common member 150. The pawl spring 174 may be a cantilever or leaf spring connected to the armature 146 at a distal end 176 that is opposite the actuator 114 and beneath or outward of the common member 150. The pawl spring 174 may have a first spring portion 178 extending outwardly toward and engaging the first heel 118 of the first pawl 108 to provide a biasing force tending to rotate the first pawl 108 in the counterclockwise direction as shown. In a similar way, a second spring portion 180 extends outwardly toward and engages the second heel 122 of the second pawl 110 to provide a biasing force tending to rotate the second pawl 110 in the clockwise direction as shown. Configured in this way, the pawl spring 174 tends to rotate the toes 116, 120 of the pawls 108, 110 toward the outer surface 106 of the gear 102 and into their locking positions. The illustrated arrangement of the pawl spring 174 is exemplary only, and other configurations of biasing mechanisms for causing the pawls 108, 110 to rotate toward their locked positions are contemplated by the inventors. For example, the pawl spring 174 could be mounted to inner surface 162 of the clutch housing 112 instead of the armature 146 while still providing the necessary biasing force to rotate the pawls 108, 110 in the desired direction. Moreover, separate springs may be provided for each of the pawls 108, 110 and may have any appropriate configuration for biasing the pawls 108, 110 independently to provide the range of motion required of the pawls 108, 110 during operation of the clutch 100 as discussed hereinafter.

Returning to FIG. 9, the clutch 100 is illustrated in a first or normal position or a first mode of operation wherein the pawls 108, 110 are rotated so that the toes 116, 120 are out of engagement with the teeth 104 of the gear 102 and the gear 102 is free to rotate in either direction. This may be considered to be a two-way unlock position or mode of the clutch 100. The armature 146 and the common member 150 may have moved to this position due to the biasing force of the armature return spring 160 when the actuator 114 is not actuated, such as when pressure is relieved from a hydraulic actuator or electricity is cut off to a solenoid actuator.

When it is desired to engage the clutch 100 to lock the gear 102 from rotation in one or both directions, the actuator 114 may be actuated to cause the armature 146 to move upwardly as shown in the drawing figures against the biasing force of the armature return spring 160. FIG. 12 illustrates the armature 146 and the common member 150 in an intermediate armature position or mode that will lock the gear 102 to prevent rotation in the counterclockwise direction while allowing free rotation in the gear 102 in the clockwise direction. As the armature 146, the common member 150 and the pawl spring 174 are drawn upward by the actuator 114, the combined torque of the torque spring 166 biasing the common member 150 in the counterclockwise direction and the second spring portion 180 biasing the second pawl 110 in the clockwise direction and urging the second distal end 154 of the common member 150 in the counterclockwise direction is greater than the torque of the first spring portion 178 biasing the first pawl 108 in the counterclockwise direction which in turn applies a force to the first distal end 152 of the common member 150 in the clockwise direction. If necessary, the clutch 100 may include a corresponding stop (not shown) for one or both of the pawls 108 to limit their rotation toward the unlocked positions shown in FIG. 9. The presence of a stop for the first pawl 108 may allow the torque spring 166 to be sized to create sufficient torque to exceed the torque created by the first spring portion 178 of the pawl spring 174 for a desired amount of deflection of the first spring portion 178 but without causing the first pawl 108 to rotate too far in the clockwise direction such that the first heel 118 may engage the teeth 104 of the gear 102.

As the common member 150 rotates in the counterclockwise direction to the position shown in FIG. 12 while being drawn upward by the armature 146, the second distal end 154 correspondingly rotates away from the second heel 122 of the second pawl 110, thereby allowing the second spring portion 180 to rotate the second pawl 110 in the clockwise direction toward the locked position. Eventually, at the intermediate position shown in FIG. 12, the second pawl 110 rotates to the locked position where the second toe 120 will engage the teeth 104 of the gear 102 to prevent rotation of the gear 102 in the counterclockwise direction. At the same time, the torque applied by the first distal end 152 of the common member 150 to the first heel 118 of the first pawl 108 causes the first pawl 108 to remain in the unlocked position so that the gear 102 is still free to rotate in the clockwise direction. Depending on the configuration of the actuator 114 and a control unit (not shown) for the clutch 100, the intermediate position or mode of FIG. 12 may be a discrete position of the armature 146 and the common member 150 that can be sustained by the actuator 114 to maintain the one-way locked for an extended duration. In other implementations of the clutch 100, the intermediate position or mode may be a transient position through which the armature 146 and the common member 150 pass before a second or two-way locked position or mode as discussed hereinafter.

As the armature 146, the common member 150 and the pawl spring 174 continue to move upward due to the force from the actuator 114 acting against the armature return spring 160, the deflection and the stress in the first spring portion 178 of the pawl spring 174 will become sufficient to overcome the torque generated by the torque spring 166 and, if the second heel 122 is still engaging the second distal end 154 of the common member 150, the second spring portion 180 of the pawl spring 174. At that point, the first spring portion 178 will cause the first pawl 108 to begin to rotate in the counterclockwise direction toward its locked position. At the same time, the engagement of the first distal end 152 of the common member 150 by the first heel 118 will cause the common member 150 to rotate back in the clockwise direction against the forces of the torque spring 166 and the second spring portion 180 of the pawl spring 174. Eventually, at a second armature position or a two-way locked position or mode of the clutch 100 shown in FIG. 13, the first pawl 108 rotates to a position where the first toe 116 will engage the teeth 104 of the gear 102 to prevent rotation of the gear 102 in the clockwise direction. The second pawl 110 remains in its locked position so the gear 102 cannot rotate in either direction.

When the clutch 100 is to be unlocked, the actuator 114 is deactivated so that the armature 146 and the common member 150 can be moved downward from the second position of FIG. 13 to the first position of FIG. 9 under the urging of the compressed armature return spring 160. As the armature 146 begins to move downward, the common member 150 will rotate in the counterclockwise under the urging of the torque spring 166. The rotation of the common member 150 will cause the first pawl 108 to rotate in the clockwise direction and out of engagement with the teeth 104 of the gear 102 to first unlock the gear 102 in the clockwise direction. The second pawl 110 will initially remain in its locked position as shown in FIG. 12. After the first pawl 108 reaches its full unlocked position, further downward movement of the armature 146 and engagement of the first distal end 152 of the common member 150 by the first heel 118 will cause the common member 150 to rotate in the clockwise direction against the force of the torque spring 166. The clockwise rotation causes engagement of the second heel 122 by the second distal end 154 of the common member 150 and corresponding counterclockwise rotation of the second pawl 110 out of the locked position of FIGS. 12 and 13 and into the unlocked position illustrated in FIG. 9.

Figure 16:
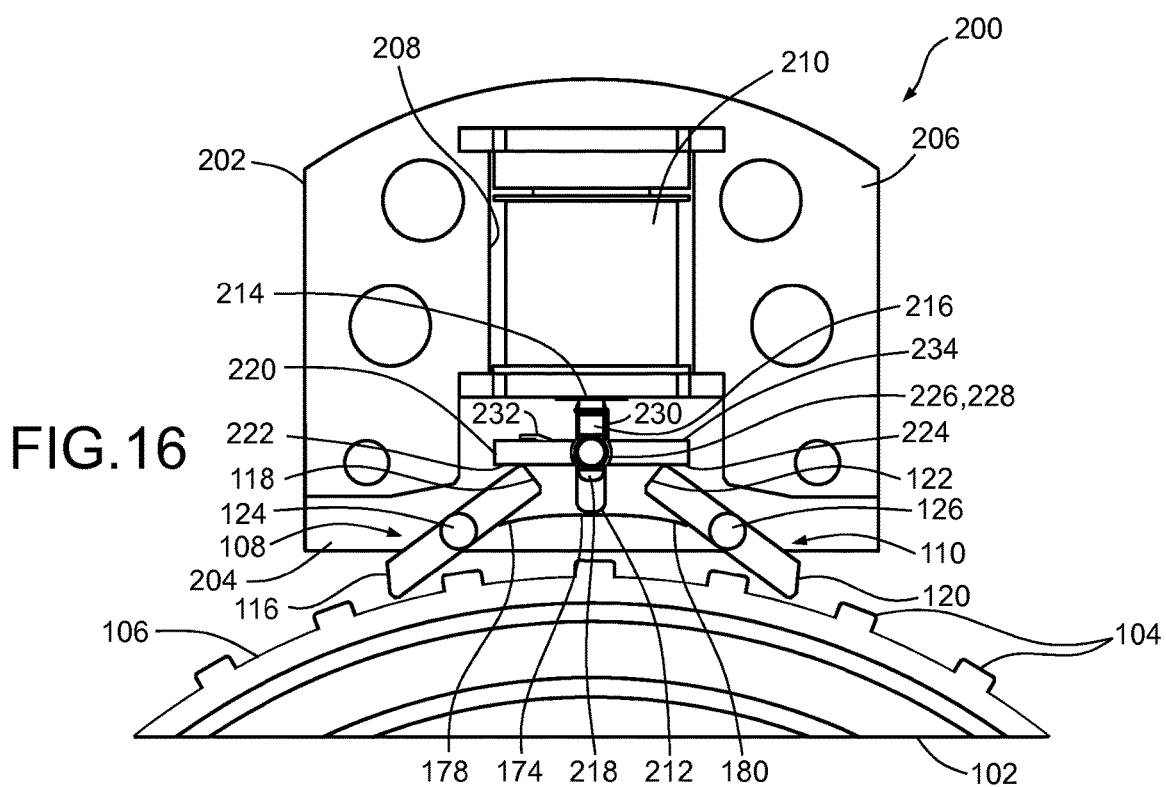
FIG. 16 is the plan view of the embodiment of the clutch of FIG. 14 with the clutch positioned in a second or two-way locked mode with respect to the gear the clutch controls.

FIGS. 14-16 illustrate a further alternative embodiment of a clutch 200 that is generally similar to the clutch 100 but having a modified armature and common member arrangement. The same components of the clutches 100, 200 are identified with the same reference numerals for purposes of clarity and brevity. Referring to FIG. 14, the clutch 200 includes a modified clutch housing 202 formed from a pair of housing plates 204 (near plate removed to reveal internal components of the clutch 200) separated by a spacer plate 206. The housing plates 204 and spacer plate 206 may be provided with an opening 208 configured to receive and retain an actuator 210 that operates to move the clutch 200 between unlocked and locked positions or modes as will be discussed further below. The housing plates 204 may further include pawl apertures (not shown) that receive the pawl pivots 124, 126 and allow the pawls 108, 110 to pivot about the pawl pivots 124, 126, and vertical slots 212 similar to those illustrated and described above. Also in this embodiment, the pawl spring 174 is mounted between the housing plates 204 with the spring portions 178, 180 engaging the heels 118, 122 of the pawls 108, 110 to bias the pawls 108, 110 toward their locked positions.

The actuator 210 includes an armature 214 extending downwardly therefrom between the housing plates 204. In this embodiment, the actuator may include an internal armature return spring (not shown) that biases the armature toward the downward extended position shown in FIG. 14 when the actuator 210 is not actuated. The armature 214 includes outwardly extending upper pivot arm or arms 216 and lower pivot arm or arms 218 are axially spaced apart along the armature 214. The pivot arms 216, 218 may extend through the corresponding vertical slots 212 of the housing plates 204 to guide the pivot arms 216, 218 as the armature 214 is extended by the armature return spring and retracted when the actuator 210 is actuated.

A modified common member 220 is mounted on the armature 214 between the upper pivot arms 216 and the lower pivot arms 218 and disposed above the first pawl 108 and the second pawl 110 with a first distal end 222 of a bottom surface of the common member 220 engaging the first heel 118 and a second distal end 224 engaging the second heel 122. The pivot arms 216, 218 receive the common member 220 so that the common member 220 can pivot about an axis that is approximately parallel to the axes 136, 138 of the pawls 108, 110, respectively. A torque spring 226 may be provided to bias the common member 220 to rotate in a counterclockwise between the pivot arms 216, 218 as shown in FIGS. 14-16. As shown, the torque spring 226 includes a coil portion 228 between the pivot arms 216, 218 of the armature 214, a first spring arm 230 engaging the armature 214, and a second spring arm 232 engaging a top surface 234 of the common member 220. The tension in the coil portion 228 of the torque spring 226 tends to push or rotate the spring arms 230, 232 away from each other. With the first spring arm 230 fixed to the armature 214, the second spring arm 232 will rotate counterclockwise away from the armature 214 as shown in FIGS. 14-16 and cause a corresponding rotation of the common member 220. The illustrated arrangement of the torque spring 226 is exemplary only, and other configurations of biasing mechanisms for causing the common member 220 to rotate relative to the armature 214 are contemplated by the inventors.

The clutch 200 operates in a generally similar manner as the clutch 100 as illustrated and described above. Referring to FIG. 14, the two-way unlock position or mode of the clutch 200 is shown with the pawls 108, 110 rotated so that the toes 116, 120 are out of engagement with the teeth 104 of the gear 102. The armature 214 and the common member 220 may have moved to this position due to the biasing force of the armature return spring when the actuator 210 is not actuated. When the actuator 210 is actuated, the armature 214 moves upwardly against the biasing force of the internal armature return spring. FIG. 15 illustrates the armature 214 and the common member 220 in the intermediate position or mode that prevents rotation of the gear 102 in the counterclockwise direction while allowing free rotation in the gear 102 in the clockwise direction. The common member 220 rotates in the counterclockwise direction and biases the first pawl 108 in the clockwise direction to maintain the first pawl 108 in the unlocked position. At the same time, the second distal end 224 rotates away from the second heel 122 of the second pawl 110 to allow the second spring portion 180 to rotate the second pawl 110 in the clockwise direction toward the locked position and eventually to the locked position where the second toe 120 engages the teeth 104 to prevent rotation of the gear 102 in the counterclockwise direction. As discussed above, the intermediate position or mode of FIG. 15 may be a discrete position of the armature 214 and the common member 220 that can be sustained by the actuator 210 or a transient position through which the armature 214 and the common member 220 pass before the second or two-way locked position or mode.

As the armature 214 and the common member 220 continue to move upward, the first spring portion 178 of the pawl spring 174 overcomes the torque generated by the torque spring 226. At that point, the first pawl 108 begins to rotate toward its locked position, and the first heel 118 will cause the common member 220 to rotate back in the clockwise direction. At the second or two-way locked position or mode of the clutch 200 shown in FIG. 16, the first toe 116 will engage the teeth 104 to prevent rotation of the gear 102 in the clockwise direction while the second pawl 110 remains in its locked position so the gear 102 cannot rotate in either direction.

The actuator 210 is deactivated so that the armature 146 and the common member 150 can be moved downward from the second position of FIG. 16 to the first position of FIG. 14 to unlock the clutch 200. As the armature 214 begins to move downward, the common member 220 rotates in the counterclockwise under the urging of the torque spring 226 to cause the first pawl 108 to rotate in the clockwise direction and out of engagement with the teeth 104 to initially unlock the gear 102 for rotation in the clockwise direction while the second pawl 110 remains in its locked position as shown on FIG. 15. After the first pawl 108 reaches its full unlocked position, further downward movement of the armature 214 will cause the common member 220 to rotate in the clockwise direction against the force of the torque spring 226. The clockwise rotation of the common member 220 causes counterclockwise rotation of the second pawl 110 out of the locked position of FIGS. 14 and 15 and into the unlocked position illustrated in FIG. 13.

INDUSTRIAL APPLICABILITY

The clutches described above can selectively control the engagement of a first pawl and a second pawl that each prevents rotation in one direction of a rotational part that may have teeth, cogs, or detents. The clutches can selectively engage and disengage the first and second pawls by converting movement created by an actuator into rotation of the first and second pawls via an intervening mechanism such as a cam actuator or a common member as described above. In locking positions, toes of the first and second pawls engage teeth or other elements of a rotating part to prevent rotation of the part. When desired, the clutches can selectively be placed in one-way or two-way unlocking positions to partially or completely disengage the clutch to allow rotation of the rotating part. In some embodiments, the clutches can include a torque spring that biases a common member to rotate in one direction to sequentially disengage one pawl and then the other pawl to transition between a two-way locked position or mode to a one-way locked position or mode and then to a two-way unlocked position or mode. With these configurations, clutches in accordance with the present disclosure can provide a smooth transition from being unlocked or disengaged to being locked or engaged and vice versa, which can improve the experience of the operator of the apparatus in which the clutches are implemented and reduce wear and tear on the components of the apparatus.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A clutch for selectively preventing rotation of a rotating component, the clutch comprising:
   a first pawl that is pivotable about a first pawl pivot between engagement with the rotating component to prevent rotation of the rotating component in a first direction and disengagement with the rotating component to allow rotation of the rotating component in the first direction;
   a second pawl that is pivotable about a second pawl pivot between engagement with the rotating component to prevent rotation of the rotating component in a second direction and disengagement from the rotating component to allow rotation of the rotating component in the second direction;

an armature that is moveable between a first armature position and a second armature position;

a common member pivotally connected to the armature and engaging the first pawl and the second pawl to move the first pawl and the second pawl between engagement with and disengagement from the rotating component; and a torque spring biasing the common member to rotate toward the first pawl and away from the second pawl, wherein, when the armature is in the first armature position, the common member engages the first pawl and the second pawl to disengage the first pawl and the second pawl from the rotating component and allow rotation of the rotating component in the first direction and the second direction, wherein, when the armature is in the second armature position, the common member engages the first pawl and the second pawl to cause the first pawl and the second pawl to engage the rotating component and prevent rotation of the rotating component in the first direction and the second direction, and wherein, when the armature is in an intermediate armature position between the first armature position and the second armature position, the common member engages the first pawl to disengage the first pawl from the rotating component and allow the rotating component to rotate in the first direction, and engages the second pawl to cause the second pawl to engage the rotating component and prevent rotation of the rotating component in the second direction.

2. The clutch according to claim 1, comprising an armature return spring biasing the armature toward the first armature position.

3. The clutch according to claim 1, comprising an actuator coupled to the armature and actuatable to move the armature from the first armature position to the second armature position.

4. The clutch according to claim 3, wherein the actuator is actuatable to maintain the armature at the intermediate armature position.

5. The clutch according to claim 1, comprising a pawl spring connected to the armature and biasing the first pawl and the second pawl toward engagement with the rotating component.

6. The clutch according to claim 1, comprising a pawl spring connected to a clutch housing of the clutch and biasing the first pawl and the second pawl toward engagement with the rotating component.

7. The clutch according to claim 1, wherein the common member comprises a bottom surface having a first distal end engaging the first pawl and a second distal end engaging the second pawl.

8. The clutch according to claim 1, wherein the armature comprises a pivot arm extending outwardly from the armature and the common member is pivotally mounted on the pivot arm for rotation of the common member relative to the armature.

9. The clutch according to claim 8, wherein the torque spring comprises a coil portion wrapped around the pivot arm, a first spring arm engaging the armature, and a second spring arm engaging the common member.

10. The clutch according to claim 1, wherein the armature comprises an upper pivot arm extending outwardly from the armature, a lower pivot arm extending outwardly from the armature and axially spaced apart from the upper pivot arm along the armature, and wherein the common member is pivotally mounted on the armature between the upper pivot arm and the lower pivot arm.

11. The clutch according to claim 1, wherein the torque spring is mounted to the armature and the common member.

12. The clutch according to claim 11, wherein the torque spring comprises a coil portion, a first spring arm engaging the armature, and a second spring arm engaging the common member.

* * * * *